Oct. 10, 1933.  O. E. LAW  1,930,454
POWER TRANSMISSION MECHANISM
Filed July 20, 1931  4 Sheets-Sheet 4
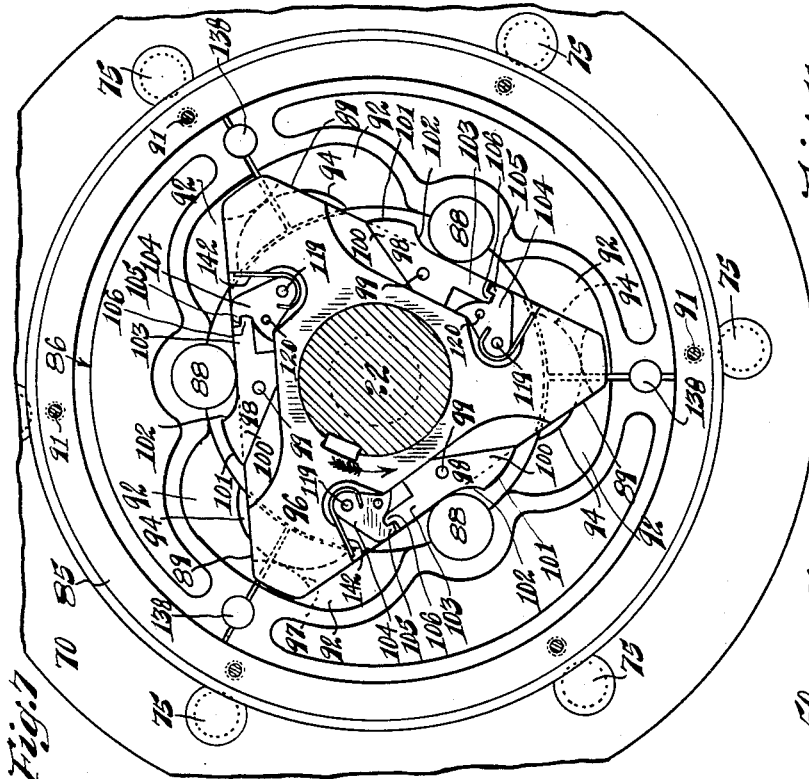
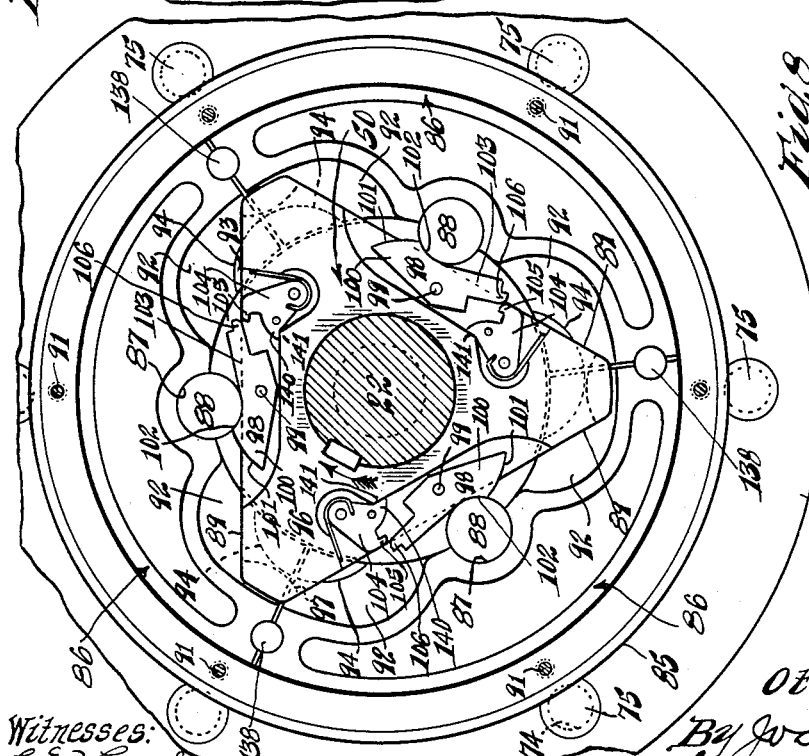
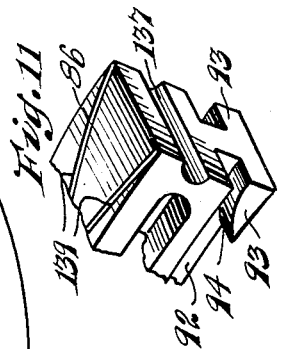
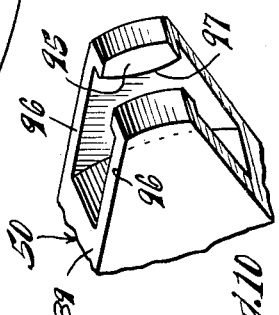
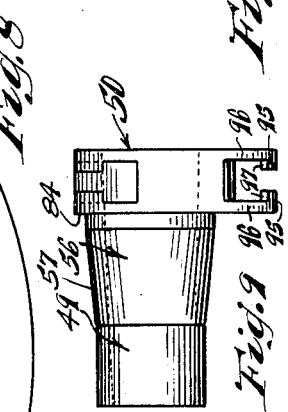

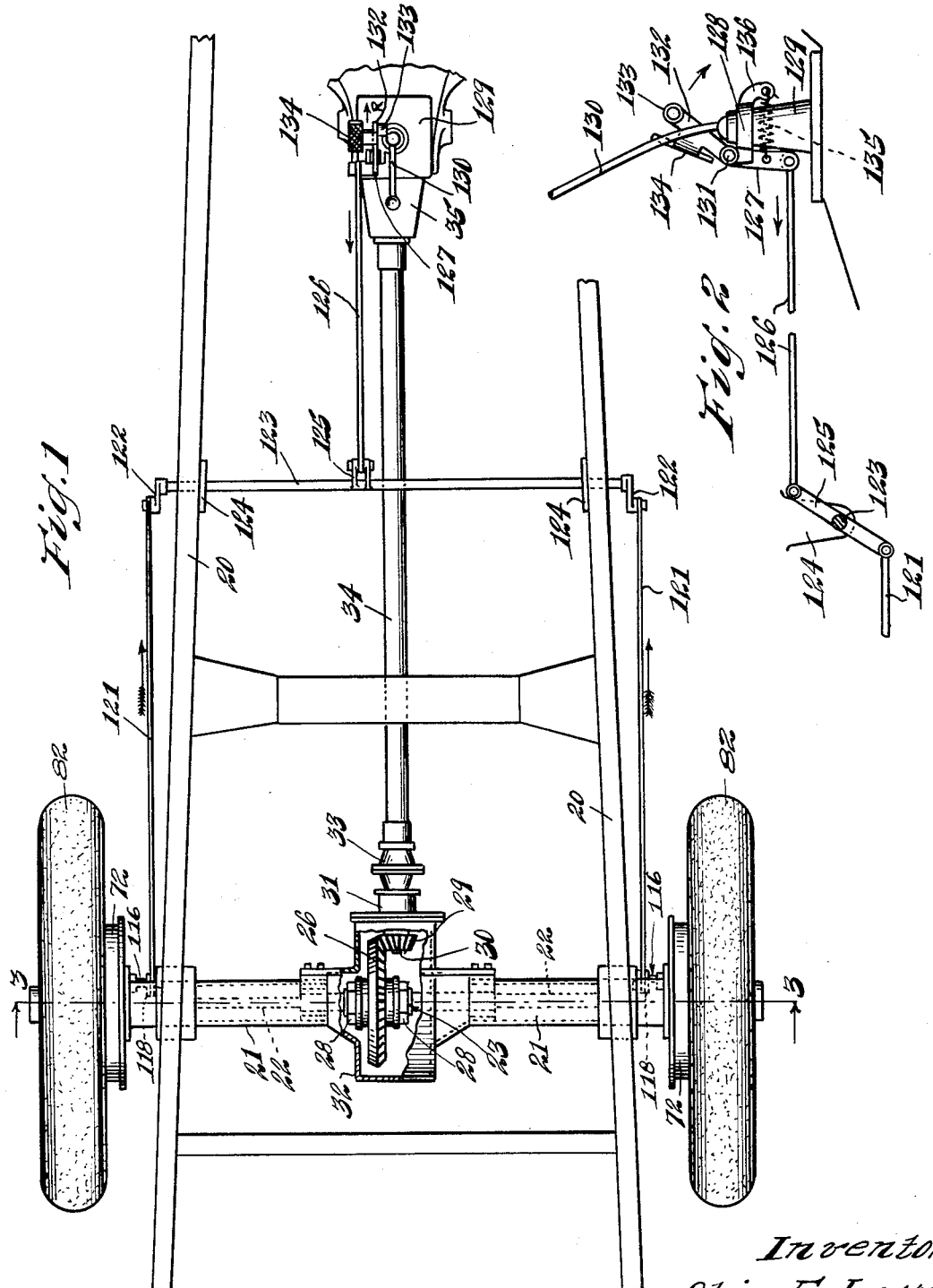

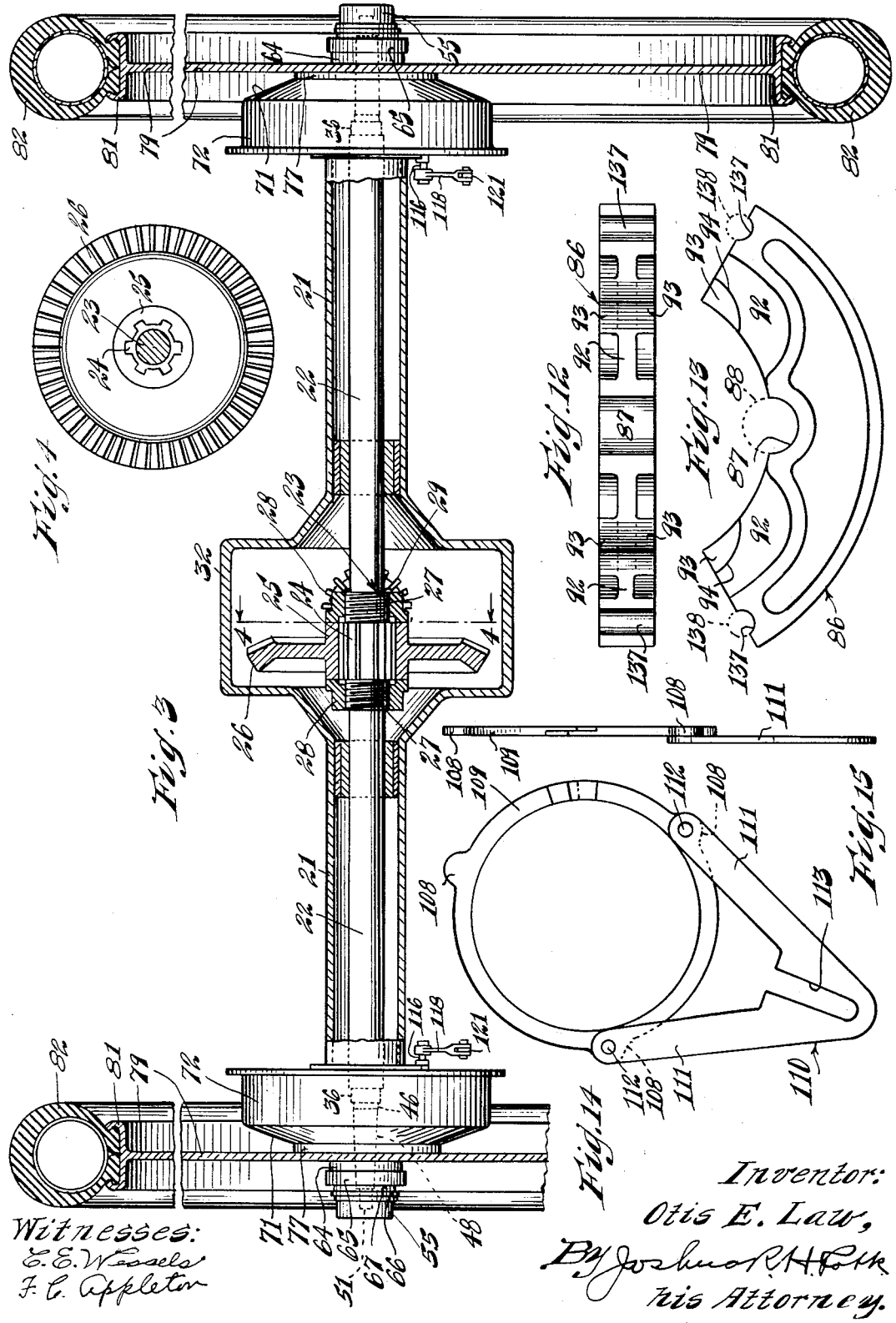

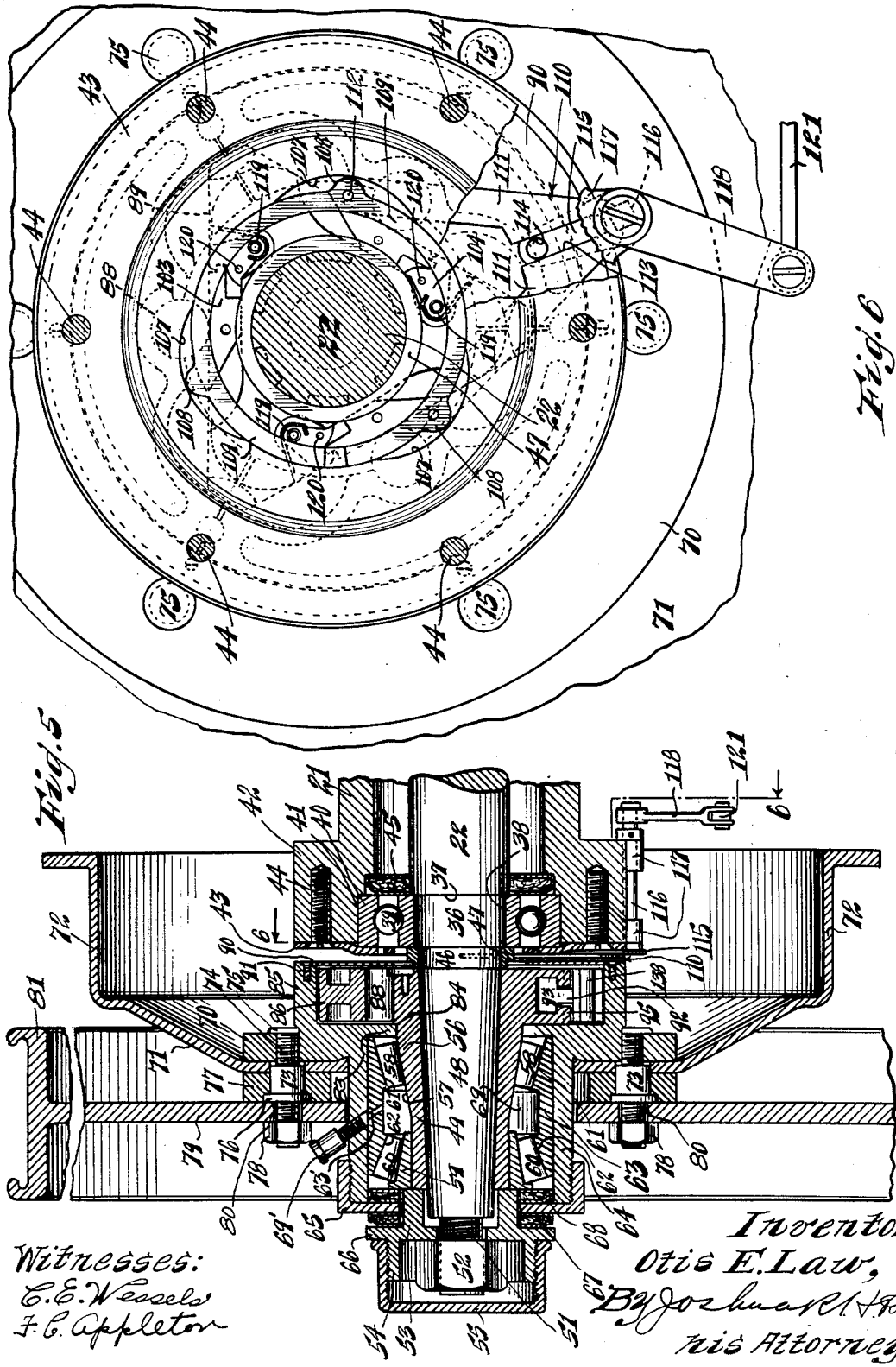

Patented Oct. 10, 1933

1,930,454

UNITED STATES PATENT OFFICE 1,930,454

POWER-TRANSMISSION MECHANISM

Otis E. Law, Brookfield, Ill., assignor, by direct and mesne assignments, to Allen Free-Wheeling Corporation, Chicago, Ill., a corporation of Illinois Application July 20, 1931. Serial No. 551,900

6 Claims. (Cl. 192—43)

This invention relates to power transmission mechanism, and more particularly to mechanism of this character for application to a motor vehicle or the like. An object of the invention is to provide an improved power transmission mechanism interposed between the main driving shaft or gearing of the motor vehicle and the traction or driving ground wheels of the vehicle, so as to secure the positive driving action under the power of the motor, and at the same time compensate for variation in the relative speed of the traction or ground wheels when traveling in a curved path, and also to provide for a free wheeling action which is both automatic and selective at the will of the operator. Another object of the invention is to provide a mechanism which will eliminate the ordinary differential driving axle of an automobile, yet it may be incorporated in connection with the same, if desired. A further object is to secure a smoother starting and stopping action of the motor vehicle, and to minimize the number of moving parts so as to secure better free wheeling and coasting action.

Other objects and advantages to be attained will hereinafter more fully appear.

The invention consists in the parts and in the combinations and arrangements of parts hereinafter described and set forth with particularity in the appended claims.

In the accompanying drawings, forming part of this specification and illustrating a practical adaptation of the invention,—

Fig. 1 is a fragmentary plan view of an automobile chassis showing the general arrangement of the applied transmission mechanism and controlling devices therefor;

Fig. 2 is a fragmentary view, in side elevation, of the controlling means for the transmission mechanism;

Fig. 3 is a section, on an enlarged scale, taken on or about the line 3—3 of Fig. 1;

Fig. 4 is a section taken substantially on the line 4—4 of Fig. 3;

Fig. 5 is a fragmentary sectional view on a still further enlarged scale, illustrating details of the parts of the mechanism in the region of the wheel hub and adjacent portion of the driving axle;

Fig. 6 is a section taken substantially on the line 6—6 of Fig. 5, showing the clutch device of the mechanism in neutral condition;

Fig. 7 is a similar view, with parts of the mechanism removed, showing the driving element of the clutch device in driving condition;

Fig. 8 is a view similar to Fig. 7, but showing the driving element of the clutch device in engagement for reversed drive;

Fig. 9 is an elevation of the driving element of the clutch device detached;

Fig. 10 is a fragmentary perspective view showing details of the cam arms of the driving element of the clutch device;

Fig. 11 is a fragmentary perspective view of the end portion of one of the clutch shoes which is engaged by the cam arms of the driving element;

Fig. 12 is an edge view of one of the clutch shoe members;

Fig. 13 is a side elevation of said member;

Fig. 14 is a face view of the clutch controlling element; and

Fig. 15 is an edge view of said clutch controlling element.

Referring now to the drawings, the numeral 20 designates the chassis frame of an automobile, the rear portion of which is mounted on a hollow axle casing 21. Extending through the casing 21 is an axle shaft 22, at the middle of which is a cylindrical enlargement 23 which is splined, as at 24, for the reception of the correspondingly formed hub portion 25 of a beveled driving gear 26. On opposite sides of the splined portion 24 the enlargement 23 of the axle shaft 22 is screw-threaded, as at 27, for the reception of jam nuts 28 which secure the positioned gear 26.

Meshing with the gear 26 is a beveled pinion 29 fixed on the end of a short shaft section 30, having a bearing in an extension 31 of the central enlargement 32 of the axle casing 21 which houses the driving gear 26 and pinion 29. This shaft 30 is connected by a universal coupling 33 to a propeller shaft 34 which latter is connected at its forward end to the transmission mechanism in the housing 35. The transmission mechanism being of the ordinary type, the details thereof, and those of the propeller shaft and its connections with the pinion 29, are only shown conventionally.

As shown, the axle shaft 22 is a single member extending from side to side of the automobile and having the traction or ground driving wheels mounted thereon, as will now be described. Referring now more particularly to Figs. 3 and 5 of the drawings, the axle shaft 22 is provided with a reduced end portion 36 forming a shoulder 37, and mounted on said portion 36, in abutting relation to the shoulder 37, is the inner ring 38 of a ball-bearing 39 whose outer ring member 40 is seated in an annular shouldered recess 41 provided in the end portion of the axle housing 21, which is enlarged, as at 42, and has an annular plate 43 bolted or screwed to its face, as at 44.
The plate 43, which may be hereinafter referred to as a cam plate, also serves to retain the outer ring member 40 of the ball-bearing 39 in its annularly shouldered recess 41 of the axle casing 21. It may be here noted that a suitable dust excluding and lubricant retaining ring 45 may be provided in the end portion of the axle housing adjacent to the bearing 39.

Adjacent to the reduced portion 36 of the axle shaft 22 is a second reduced portion 46 on which is located a spacing ring 47, while next adjacent to the reduced portion 46 the axle shaft 22 is tapered for considerable length, as at 48, for the reception of a correspondingly bored elongated hub portion 49 of a driving element 50, obviously keyed so as to rotate with the shaft as later more fully described. The extreme end portion 51 of the axle shaft 22 is further reduced and screw-threaded for the reception of a locking nut 52 which clamps an interposed abutment ring 53 against the outer end of the hub portion 49 of said driving member 50. As shown, said member 53 is provided with an externally screw-threaded collar 54 for the reception of a dust cap 55.

The hub portion 49 of the driving member 50 is formed with an integral annular raised portion 56 which has a tapered face 57 constituting the inner raceway for a roller-bearing 58, and sleeved on the outer end portion of the hub is an opposed inner ring member 59 of a roller-bearing 60, said ring member 59 being adjustably retained by the inner end of the abutment ring 53. The outer raceways 61 and 62 of the roller-bearings 58 and 60, are formed on a single ring member 63, fitted within the wheel hub member 64, the outer end portion of which is screw-threaded for the reception of a cap member 65 having a central opening for the reception of the abutment ring 53. Interposed between an annular collar 66 of said abutment ring 53 and said cap member 65 is a packing ring 67, while at the inner side of said cap member 65 is a second packing ring 68. Between the bearing rings 61 and 62 is a chamber 69 for the reception of a lubricant which may be supplied through an ordinary grease cup 69' on the hub 64 and a registering port 63' in the bearing ring 63.

The hub member 64 is provided with an integral annular collar 70 on the outer face of which is mounted the body web 71 of a brake drum 72. As shown, the web 71 is apertured for the reception of a bolt 73 having a screw-threaded inner end portion 74 which is inserted in a corresponding threaded opening in the collar 70, the extreme inner end portion of said bolt being upset or riveted as at 75, so as to be secured against removal. The body portion of the bolt 73 is provided with a collar 76 which is seated flush in a counter-sunk portion in a bore provided for the reception of the bolt 73 in an annular spacing member 77. The remainder of the bolt 73, outside of the collar 76, is screw-threaded for the reception of a locking nut 78 which detachably secures the body web 79 of the wheel in place, said body web being formed with an annular series of apertures 80 for the reception of the bolts 73, which are also arranged in a corresponding annular series. The web 79 carries thereon, integrally or otherwise, the rim 81 in which the tire 82 is secured in the usual manner, said rim being centralized with respect to the anti-friction bearings 58 and 60.

The wheel hub member 64 is provided with an internal annular collar 83 affording an abutment which engages the inner end of the bearing ring 63 and an annular shoulder 84 which is afforded by the adjacent surrounding face of the driving member 50. At the inner end of the hub member 64 is an annular collar 85 with which cooperates arcuate clutch elements or shoes 86. The circumferential faces of said shoes 86 are formed on the same radius as the cylindrical inner face of the collar 85 so as to snugly engage the same throughout when pressed thereagainst, and the middle portion of each shoe is provided with a transverse seat 87 in which is rotatably fitted a cylindrical bearing member or roller 88. The bearing members or rollers 88 engage the sides 89 of the driving member 50. As shown, said driving member 50 is triangular, or, in other words, has three symmetrical working sides 89, and the seats in the shoes 86 for the bearing members or rollers 88 are extended on opposite sides of the diametrical lines through the axes of said seats, whereby to retain the bearing members or rollers 88 against removal transversely from said seats, but permitting endwise movement, as well as rotation of the rollers therein, said rollers being retained within said seats with limited endwise movement by the internal annular collar 83 of said hub member 64 and an annular cover plate 90 whose peripheral marginal portion is seated in an annular recess in the end face of the hub collar 85, said plate 90 being held in place by screws 91. Said plate 90 also serves to retain the shoes 86 against lateral displacement in the hub member 64.

In the normally released condition of the shoes 86, with respect to the collar 85 of the wheel hub member 64, there is but slight clearance between the circumferential faces of the shoes and the inner cylindrical face of said collar 85, or, in other words, just sufficient clearance to permit said collar to rotate freely about said shoes without friction, this clearance being maintained when the rollers 88 are in contact with the sides 89 of the driving member 50 at or about the middle thereof. In order to maintain the shoes in substantially equalized balance, on opposite sides of the rollers 88, the end portions of the shoes are reduced in thickness, as at 92, and on opposite sides of said reduced portions, lugs 93 are provided, said lugs having inclined rounded faces 94 which are engaged by cam projections 95 formed on the inner faces of bifurcated end portions 96 of the driving member 50, and having convex cam faces 97. In the neutral position of the driving member 50, with respect to the clutch shoes 86, the cam projections 95 each straddle a pair of the lugs 93 at the meeting ends of said shoes 86, the highest points of the cam faces 97 being in engagement with the highest points of the lugs 93, thereby withholding the end portions of the shoes 86 from engagement with the collar 85, and by the slidable interfitting engagement of the cooperating end portions of the driving member 50 and the shoes 86, the shoes are guided in their movement toward and away from the collar 85, and they are held in slightly spaced relation between the internal annular collar 83 and the inner face of the cover plate 90, whereby friction between the sides of said shoes and the adjacent wall faces of the hub member and cover plate is prevented when the hub member is rotated independently of said driving member 50, as will be presently more fully set forth.

As the hub portion 49 of the driving member 50 is keyed or splined on the tapered portion 48 of the axle shaft 22, said driving member, of course, rotates with said axle shaft. If the cylindrical bearing members or rollers 88 are held in a position in contact with the sides 89 of the driving member 50, at the middle thereof, the shoes 86, as above described, will be out of contact with the collar 85 of the wheel hub 64, and, consequently, the driving member and the shoes are free to rotate in this relation independently of the wheel hub member, or, if the axle shaft is held from rotation, the wheel hub is free to rotate about the shoes 86 independently thereof. However, by rotating the driving member 50 in either direction, the relative positions of the bearing members or rollers 88 are shifted on the sides 89 of said driving member to one side of the center, and at the same time the cam projections 95 on the arms 96 of the member 50 engage the lugs 93 at a lower point, whereupon the shoes 86 are permitted to move toward the collar 85 into peripheral engagement with the inner cylindrical face of the collar 85, in which relation of the parts the wheel is driven positively by the axle shaft 22. Should the wheel hub, for any reason, tend to rotate faster than the axle shaft 22, the rollers 88 will travel to a lower point on the side 89 of the driving member 50.

To limit the relative movement of the bearing members or rollers 88, with respect to the driving member 50, said member 50 is provided with dogs 98 which are pivoted, as at 99, and have projecting end portions 100, said end portions having a convexed outer end face 101 and a concaved inner shoulder 102 which latter affords a stop for the roller 88 in one direction, said dogs being held in normal position by having a shouldered extension 103 which is normally engaged by a spring-pressed latch member 104, said latch member having a hooked portion 105 which engages the shoulder portion 106 of the dog 98. This is best illustrated in Fig. 7 of the drawings, wherein the dog 98 and the latch member 104 are in normally engaged relation and the axle shaft 22 is rotating in the direction of the arrow. Under this condition the clutch shoes 86 are forced into engagement with the collar 85 of the wheel hub member 64, and the wheel is thereby driven positively with the axle shaft. Should the momentum be such that the wheel travels faster than the axle shaft, the rollers 88 will travel along the sides of the driving member 50 until arrested by the concaved shoulder 102, and as the rollers are thus arrested in central positions on the sides 89 of the driving member, the clutch shoes 86 are out of engagement with the collar 85, and the wheel hub is free to rotate independently of the axle shaft.

If the latch members 104 are released from engagement with the extensions 103 of the dogs 98, and the axle shaft 22 is rotated reversely, or, in other words, in the direction of the arrow indicated in Fig. 8 of the drawings, the rollers 88 will ride along the sides 89 of the driving member 50 in engagement with the concaved shoulders 102 of the dogs 98, the dogs being rocked on their pivots 99 until the respective rollers 88 reach points on said sides 89 whereby the shoes 86 are forced into peripheral engagement with the inner cylindrical wall of the collar 85. Should the momentum of the wheel be such that it rotates faster than the axle shaft 22, in the direction indicated by the arrow in Fig. 8, the shoes 86 will move in engagement with the collar 85 until the rollers 88 reach a centralized position on the sides 89 of the driving member 50, whereupon the shoes are released from engagement with the collar 85, and the wheel is free to rotate independently of the axle shaft.

Should the axle shaft 22 be again reversely operated in the direction indicated by the arrow in Fig. 7 of the drawings, the rollers 88 riding on the sides 89 in engagement with the extensions 103 of the dogs 98, said dogs will be automatically restored to locking engagement with the latch members 104 so that the concaved shoulders 102 are held in fixed position to limit the travel of the rollers 88 in the direction of centralized position on the sides 89 of the driving member 50, whereby to release the shoes from engagement with the collar 85 and permit the wheel to rotate freely and independently of the axle shaft.

Means for selectively actuating the latch members 104 will now be described. Referring now more particularly to Figs. 5, 6, 14, and 15 of the drawings, it will be noted that the annular plate 43, which is secured to the end of the axle casing 21, is provided at triangular points with arcuate notches 107 about its central opening, said notches accommodating radial rounded projections 108 on the circumference of a split resilient expansion ring 109, which latter, in normal distended condition, fits the opening in said annular plate 43 rather snugly, but is freely slidable therein. A yoke member 110 has its leg members 111 riveted somewhat loosely, as at 112, to said ring 109, whereby to effect the rotation of the ring and permit limited contraction thereof. This yoke member 110 is provided with a slot 113 which is radially disposed with respect to the axis of the ring 109, and cooperating with said slotted portion 113 of the yoke 110 is a stud or roller 114 which is mounted on a lever arm 115 fixed on a rock shaft 116, which latter is journalled in bearings 117 on the axle casing 21 near the end thereof, said rock shaft having fixed thereon a second lever arm 118, whereby the ring 109 may be rotated in either direction, and upon rotation the circumferential projections 108 on the ring are brought into engagement with the arcuate recessed portions 107 of the annular plate 43 which serve as cams to effect the contraction of the ring 109.

The respective latch members 104 are provided with studs 119 having anti-friction rollers and extending into close proximity to the inner side of the ring 109, whereby to be engaged by said ring when the latter is contracted, and thereby rock the latch members on their pivots 120 so as to release the hooked portion 105 of the latch members from engagement with the shoulders 106 on the dogs 98.

As shown in Fig. 1 of the drawings, lever arms 118 may be conveniently connected by rods 121 to arms 122 on the ends of the rock shaft 123 which is mounted, as at 124, on the chassis frame of the automobile. The rock shaft 123 is provided with a second lever arm 125 in opposed relation to the arms 122, said arm 125 being connected by a rod 126 to a lever 127 which is mounted on a bracket 128 secured to the pedestal 129 on which the usual gear shift lever 130 is mounted. The lever 127, which is pivoted as at 131, is provided with an extension 132 having a laterally disposed roller 133 arranged in the path of said gear shift lever 130 when the latter is moved to the reverse position or a position in which the transmission gearing is shifted to drive the car rearwardly. In the neutral and forward travel positions of the gear shift lever 130, the latter is out of range of the roller 133 on the lever extension 132. The lever extension 132 is provided with a laterally disposed foot pedal 134 by which it may be actuated at the will of the driver. The lever 127 and its connections with the latch operating ring 109, are held in normal position by a spring 135 which is secured at one end to the lever, and at its opposite end to a bracket extension 136. The parts of the controlling means just described are more or less conventionally shown, as the same are subject to considerable modification within the purview of the invention, and it is also to be understood that the construction and arrangement of the parts and the axle connections and clutch mechanism between the axle and traction wheels, are the same at both sides of the machine, except that they are arranged in reverse order, or, in other words, arranged so that the two wheels are driven in the same direction. That is to say, the details illustrated in Figs. 5 to 8, inclusive, of the drawings, are of the parts associated with the right-hand traction wheel, and the driving member 50 and associated clutch parts which engage the collar 85 of the hub member 64 of the left-hand wheel are identical except in reverse arrangement from that shown in said figures. In order to hold the segmental shoe members 86 in their annular working relation with respect to each other, it is preferable to provide rounded recesses 137 in their meeting ends and to insert, in the cooperating recesses, a cylindrical key member 138 with rather a loose fit so as to permit limited universal movement of each shoe with respect to the other. It is also preferable to provide the circumferential faces of the shoes 86 with diagonally disposed, or otherwise suitably arranged oil grooves 139.

Normally, the extensions 103 of the dogs 98 are flush with the sides 89 of the driving member 50, and they are held in this relation by the latch members 104 hereinbefore described, which are pivoted as at 120, and are held with their shouldered portions 140 against shoulders 141 formed on the driving member 50 by the spring elements 142, as best shown in Figs. 7 and 8. The shouldered portions 106 of the dogs 98, and the cooperating hook portions 105 of the latch members 104, are formed with rounded or beveled corners whereby, when the extensions 103 of said dogs 98 are brought forcibly into engagement with each other, illustrated more clearly in Fig. 8 of the drawings, the latch members are snapped into the engaging relation, as illustrated in Fig. 7. This is of material advantage in that should the parts be set for the reverse operation of the axle shaft 22, and the shaft then be reversed for forward drive, said dogs 98 will be automatically engaged with the latch members 104 by the action of the rollers 88 riding in engagement with the extensions 103 of said dogs 98.

By the structural arrangements herein described, ideal free wheeling is attained in all forward speeds of the car, both automatically and selectively at the will of the driver, resulting not only in relieving the driver of considerable physical exercise and strain, but also as a matter of economy in the amount of fuel consumed, for it is possible for the car to travel a considerable distance by its momentum, and particularly in coasting downgrade. The principal advantage is that during the free wheeling action the movable parts of the interposed driving mechanism between the axle shaft and the transmission gearing, or other connection with the motor shaft, are not in operation, or at least no part thereof is moving with the traction wheel to any way create undue friction or weight which will tend to retard the momentum of the car. In all forward speeds of the car the axle shaft 22 will automatically engage the clutch mechanism with the wheel hub member, and, as hereinbefore pointed out, should the car be traveling downgrade, especially which is relatively steep, and should the regular brakes fail to hold sufficiently to check the speed of the car, the driver may depress the pedal 134 which will have the effect of throwing the member 110 so as to actuate the ring 109 to release the latch members 104 from the dogs 98 so that the shoe members 86 are free to move with the collar portion 85 of the wheel hub member 64 until the rollers 88 have passed the neutral diametrical relation with respect to the axis of the axle shaft to the side in the direction of rotation, whereupon the shoe members are wedged into circumferential engagement with the collar 85 with braking effect, whereby the wheel will not rotate any faster than the axle shaft 22, or, in case the axle shaft is held from rotation, the wheel will be stopped from further rotation.

Any suitable means of control may be substituted for that herein shown, but, for practical purposes, the control through the medium of the gear shift lever 130 and the cooperating lever 127, together with the foot pedal 134, as provided on said lever 127, is a simple yet highly efficient method of control.

The particular arrangement of the anti-friction bearing 39, which is located between the axle shaft 22 and axle casing 21, and the two opposed anti-friction bearings 58 and 60, within the wheel hub member 64, is such that torque of the wheel is overcome so that binding of the parts of the interposed clutch mechanism is prevented. This arrangement also greatly minimizes friction and adds materially to the efficiency of the free wheeling effect of the mechanism.

Obviously, the construction and arrangement may be modified in many respects without at least departing from the scope of the invention, as defined by the appended claims. The invention, therefore, is not limited to the specific construction and arrangement shown.

Having thus described my invention, what I claim as new and desire to secure by Letters Patent is:

1. Mechanism of the class described comprising, in combination, an axle casing, a driving shaft rotatable in said casing, a polygonal driving element fixed on said driving shaft to rotate therewith, a traction wheel rotatable on said driving shaft, said traction wheel having an annular hub collar, segmental clutch shoes, the circumferential faces of which are engageable with said annular hub collar, roller elements interposed between said driving element and said clutch shoes whereby to effect the engagement of said shoes with said hub collar when said driving element is rotated in either direction, and releasable stop members on said driving element for limiting the travel of said roller elements, whereby said traction wheel is rotated positively with said axle shaft in the direction of rotation, and whereby also said traction wheel may rotate freely and independently of said axle shaft at a greater speed in the same direction of rotation.

2. Mechanism of the class described comprising, in combination, an axle casing, a driving shaft rotatable in said casing, a polygonal driving element fixed on said driving shaft to rotate therewith, a traction wheel rotatable on said driving shaft, said traction wheel having an annular hub collar, segmental clutch shoes, the circumferential faces of which are engageable with said annular hub collar, roller elements interposed between said driving element and said clutch shoes whereby to effect the engagement of said shoes with said hub collar when said driving element is rotated in either direction, releasable stop members on said driving element for limiting the travel of said roller elements, whereby said traction wheel is rotated positively with said axle shaft in the direction of rotation, and whereby also said traction wheel may rotate freely and independently of said axle shaft at a greater speed in the same direction of rotation, and means for selectively controlling the actuation of said releasable stop members.

3. Mechanism of the class described comprising, in combination, a driving shaft, a wheel rotatable about said shaft, said wheel having a hub collar, a polygonal driving element fixed on said shaft to rotate therewith, segmental clutch shoes interposed between said driving element and said hub collar, the circumferential faces of said shoes being engageable with the inner cylindrical face of said collar, roller elements interposed between said driving element and said clutch shoes, said roller elements being movable operably along the sides of said driving element, and releasable stop members for limiting the travel of said roller elements.

4. Mechanism of the class described comprising, in combination, a driving shaft, a wheel rotatable about said shaft, said wheel having a hub collar, a polygonal driving element fixed on said shaft to rotate therewith, segmental clutch shoes interposed between said driving element and said hub collar, the circumferential faces of said shoes being engageable with the inner cylindrical face of said collar, roller elements interposed between said driving element and said clutch shoes, said roller elements being movable operably along the sides of said driving element, releasable stop members for limiting the travel of said roller elements, and selective controlling means for said releasable stop elements.

5. Mechanism of the class described, comprising, in combination, an axle shaft, a traction wheel journaled on said axle shaft, and driving means between said axle shaft and traction wheel comprising a driving member fixed on the shaft to rotate therewith and having a portion for supporting the journal bearing of the wheel, an annular clutch member on the traction wheel surrounding said driving member of the axle shaft, an annular series of segmental clutch members interposed normally loosely between said driving clutch member of the axle shaft and said annular clutch member of the traction wheel, said normally loose segmental clutch members being engageable circumferentially with said annular clutch member of the traction wheel, said driving clutch member of the axle shaft having circumferential cam portions effective in the rotation of the member in either direction, said circumferential cam portions having depressible stop elements substantially at the middle thereof, and roller elements interposed between said circumferential cam portions of said driving clutch member of the axle shaft and said normally loose segmental clutch members, said roller elements being rotatively seated medially of said segmental clutch members, and means for releasably locking said depressible stop elements of said driving clutch member of the axle shaft in raised position.

6. The herein described power transmission mechanism, comprising an axle shaft, a driving clutch member fixed on said axle shaft to rotate therewith, said clutch member having a hub portion affording a support for a journal bearing and a polygonal circumferential clutch operating portion, a traction wheel journaled on said journal bearing supporting portion of said driving clutch member, said traction wheel having an annular clutch member fixed thereon and surrounding said driving clutch member, an annular series of normally loose segmental clutch shoes interposed between said driving clutch member and said annular clutch member, said clutch shoes being circumferentially engageable with said annular clutch member and having transverse medial recesses at their inner sides, roller members fitted rotatively in the recessed portions of said segmental members and cooperably engageable with the circumferential polygonal portions of said clutch driving member whereby to move said normally loose segmental clutch members into engagement with said annular clutch member upon the rotation of said driving clutch member in either direction, releasably latched depressible stop members on said polygonal circumferential portions of said driving clutch member, and means for selectively controlling the release of said depressible elements.

OTIS E. LAW.